United States Patent [19]

Steinberger

[11] 4,283,795
[45] Aug. 11, 1981

[54] ADAPTIVE CROSS-POLARIZATION INTERFERENCE CANCELLATION ARRANGEMENTS

[75] Inventor: Michael L. Steinberger, Colts Neck, N.J.

[73] Assignee: Bell Telephone Laboratories, Incorporated, Murray Hill, N.J.

[21] Appl. No.: 81,366

[22] Filed: Oct. 3, 1979

[51] Int. Cl.³ .............................................. H04B 1/10
[52] U.S. Cl. .................................. 455/283; 455/303; 343/100 PE
[58] Field of Search ..................... 455/59, 60, 63, 284, 455/296, 303, 305, 283, 295; 343/100 PE

[56] References Cited

U.S. PATENT DOCUMENTS

| | | | |
|---|---|---|---|
| 3,369,234 | 2/1968 | Bush et al. ..................... | 343/100 PE |
| 3,453,622 | 7/1969 | McKesson ..................... | 343/100 PE |
| 3,883,872 | 5/1975 | Fletcher et al. ............... | 343/100 PE |
| 3,943,517 | 3/1976 | Vogt .............................. | 343/100 PE |
| 3,986,121 | 10/1976 | Tirro et al. ..................... | 455/59 |
| 4,051,474 | 9/1977 | Mack et al. ..................... | 343/100 PE |
| 4,057,802 | 11/1977 | Dollinger ....................... | 343/100 LE |
| 4,090,137 | 5/1978 | Soma et al. .................... | 455/60 |

OTHER PUBLICATIONS

NTC 76 Conf. Record, Nov. 29-Dec. 1, 1976, Article by E. D. Horton, pp. 13.4-1 to 13.4-5.
ICC77 Conf. Record, vol. 3, Chicago, Ill., Jun. 12-15, 1977, Article by P. D. Lubell et al., pp. 49.3-284 to 49.3-289.
Comsat Tech. Review, vol. 7, No. 1, Spring 1977, Article by A. E. Williams, pp. 247-262.
Electronics Letters, vol. 14, No. 24, Nov. 23, 1978, Article by P. Delogne et al., pp. 770-772.

Primary Examiner—Jin F. Ng
Attorney, Agent, or Firm—Erwin W. Pfeifle

[57] ABSTRACT

The present invention relates to an adaptive cross-polarization cancellation arrangement where a first desired polarized signal and a second interfering orthogonally polarized signal, including cross-polarization components, are concurrently received at an antenna. In the present arrangement, the orthogonally polarized components of the received signal are separated and transmitted along separate paths and recombined after the phase and amplitude of the separated polarized interfering signal sample has been appropriately adjusted for maximally cancelling cross-polarization components thereof in the other path. A feedback path includes circuitry for obtaining a sample of any remaining interfering signal in the recombined output signal, generating a signal representative of the power envelope of such sample, and then generating appropriate control signals in response to such representative power envelope signal to provide improved adjustment of the amplitude and phase of the separated polarized interfering signal sample.

9 Claims, 6 Drawing Figures 4,283,795

ADAPTIVE CROSS-POLARIZATION INTERFERENCE CANCELLATION ARRANGEMENTS

TECHNICAL FIELD

The present invention relates to adaptive cross-polarization interference cancellation arrangements and, more particularly, to adaptive cross-polarization interference cancellation arrangements wherein a desired polarized signal and an orthogonally polarized interfering signal with cross-polarization components thereof are received at an antenna, the orthogonally polarized components of the two signals are separated, the separated main interfering signal is appropriately adjusted in amplitude and phase and added to the separated desired signal components to effect substantial cross-polarization cancellation, and a feedback path provides appropriate feedback control signals to effect proper amplitude and phase adjustment of the separated main interfering signal.

BACKGROUND ART

Cross-polarization interference, that is, interference due to signals whose polarization is supposed to be orthogonal to the polarization of the receiver, has created problems in terrestrial and satellite microwave communication systems. In, for example, satellite communication systems, larger earth stations include adaptive techniques for improving cross-polarization isolation. These techniques tend to be systems which mechanically rotate the antenna feed to compensate for changing conditions. In this regard see, for example, the article "A Dual-polarized 4/6 GHz Adaptive Polarization Control Network" by A. E. Williams in *Comsat Technical Review*, Vol. 7, No. 1, Spring 1977 at pp. 247–262.

Another arrangement is disclosed in U.S. Pat. No. 3,883,872 issued to J. C. Fletcher et al. on May 13, 1975 which relates to a receiving system for automatically selecting a desired one of two approximately orthogonally polarized signals occupying the same bandwidth. The received signals are provided by any orthomode antenna system at a pair of output ports and then applied to the inputs of a hybrid junction to produce sum and difference signals. The resulting sum signal at one output port comprises components of the undesired one of two orthogonally polarized signals and is used to coherently detect and dynamically balance out the undesired signal components that are included at the difference signal port. The desired one of two orthogonally polarized signals is thereby provided at the difference port of the hybrid junction, and feedback loops are used to effect dynamic balancing.

Still another arrangement is disclosed in U.S. Pat. No. 3,943,517 issued to G. F. Vogt on Mar. 9, 1976 which relates to an adaptive polarization receiving system wherein a polarization follower is employed to make the system phase angle track the orientation angle of linear polarization of the received carrier so that the receiver apparatus will follow polarization changes in the information signal. This apparatus includes a closed loop feedback network in which an error signal is generated whenever the system phase angle differs from the incident polarization angle, and in which a control voltage is developed for superimposition on a signal which scans the receiving antenna at a constant frequency. At the same time, the error voltage is used to optimize the reproduction of the received message information in the presence of variations in incident polarization angle by off-setting the signal fading which results.

Adaptive co-channel interference suppression systems have also been designed but do not solve the problem of cross-polarization interference. In this regard see, for example, "An Adaptive Co-channel Interference Suppression System to Suppress High Level Interference in Satellite Communication Earth Terminals" by E. D. Horton in *National Telecommunication Conference Record*, Dallas, Tex., Nov. 29–Dec. 1, 1976, Sect. 13.4, pp. 1–5 and "Suppression of Co-channel Interference with Adaptive Cancellation Devices at Communications Satellite Earth Stations" by P. D. Lubell et al in *ICC 77* Conference Record, June 12–15, 1977, Chicago, Ill., Vol. 3, pp. 49.3-284–49.3-289. In these disclosed systems, an independent sample of the interfering signal is obtained, the phase and amplitude of which is adjusted by an adaptive filter to provide an estimate of the interference in the received signal. This estimate is then subtracted from the received signal to give the undistorted desired signal and a residue from the subtract operation. The response of the adaptive filter depends on the correlation between this residue and the interference sample.

Another co-channel interference suppression arrangement is disclosed in a co-pending patent application Ser. No. 81,552 filed on the same day as the present application for D. M. Brady and A. M. Gupta wherein a main antenna picks up the desired signal and some interfering signal and a small auxiliary antenna is pointed in the direction of the interfering source and picks up a sample of the interfering signal. The interfering sample is then put through a quadrature modulator for adjustment of its phase and amplitude and for providing an estimated cancellation signal at the output. This estimated cancellation signal is then combined with the main antenna output to give a corrected signal. After down-converting, the present system detects the power in the corrected signal and a processor in response to such power detection generates a small dither signal which is added to the control signals to vary the phase and amplitude in the quadrature modulator of the residual interference in the corrected signal.

The problem remaining in the prior art is to provide an adaptive cross-polarization cancellation arrangement which is both simple and inexpensive and provides excellent isolation and response to changing conditions in comparison with known arrangements.

SUMMARY OF THE INVENTION

The foregoing problem in the prior art has been solved in accordance with the present invention which relates to adaptive cross-polarization interference cancellation arrangements and, more particularly, to adaptive cross-polarization interference cancellation arrangements wherein a desired polarized signal and an orthogonally polarized interfering signal with cross-polarization components thereof are received at an antenna, the orthogonally polarized components of the two signals are separated, the separated main interfering signal is appropriately adjusted in amplitude and phase in a quadrature modulator in response to control signals, and added to the separated desired polarized signal components to effect appropriate cross-polarization cancellation, and a feedback path includes means capable of measuring the power envelope of an output signal to permit a processor to generate the proper control signals to the quadrature modulator for properly adjusting the amplitude and phase of the separated main interfering polarized signal.

It is an aspect of the present invention to provide arrangements capable of providing substantial cross-polarization interference cancellation between two or more orthogonally polarized signals occupying the same or adjacent overlapping frequency channels.

Other and further aspects of the present invention will become apparent during the course of the following description and by reference to the accompanying drawings.

BRIEF DESCRIPTION OF THE DRAWING

Referring now to the drawings, in which like numerals represent like parts in the several views.

DETAILED DESCRIPTION

Figure 1:
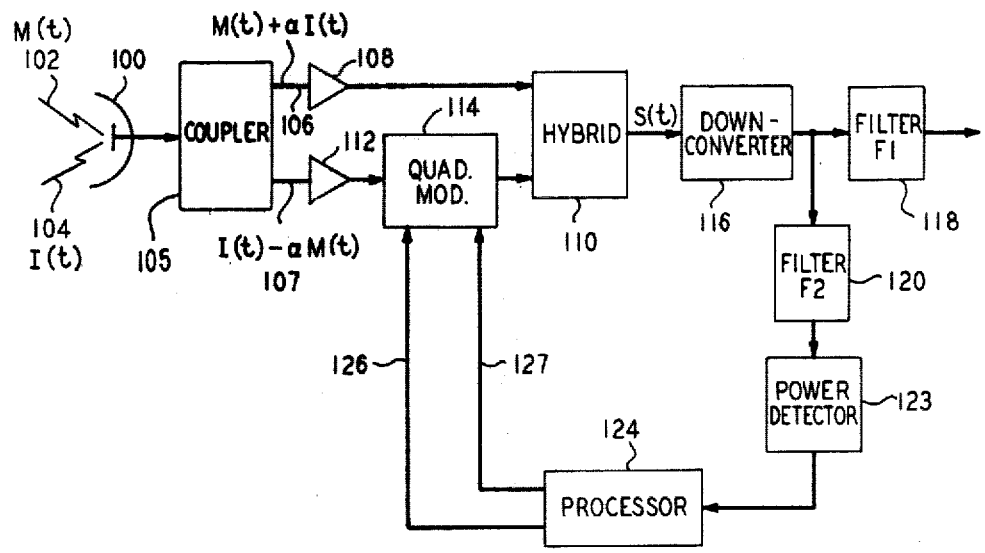
FIG. 1 illustrates a block diagram of an adaptive cross-polarization interference cancellation arrangement in accordance with the present invention for use in cancelling cross-polarization interference between orthogonally polarized signals received in adjacent overlapping frequency channels.

FIG. 1 is a block diagram of an adaptive cross-polarization interference cancellation arrangement in accordance with the present invention for use in cancellation of cross-polarization interference between a desired polarized signal and interfering cross-polarization components from a second orthogonally polarized signal received in adjacent overlapping frequency channels.

The description which follows is directed to the use of the present arrangements in a small earth station receiving terminal associated with a satellite communication system for suppressing cross-polarization components of an interfering linearly polarized signal concurrently received from the same or a different direction with an orthogonally polarized desired signal from the satellite. It is to be understood that such description is exemplary only and is for purposes of exposition and not for purposes of limitation. It can readily be appreciated that the present arrangements can also be used with terrestrial microwave systems for effecting cross-polarization interference cancellation.

Figure 2:
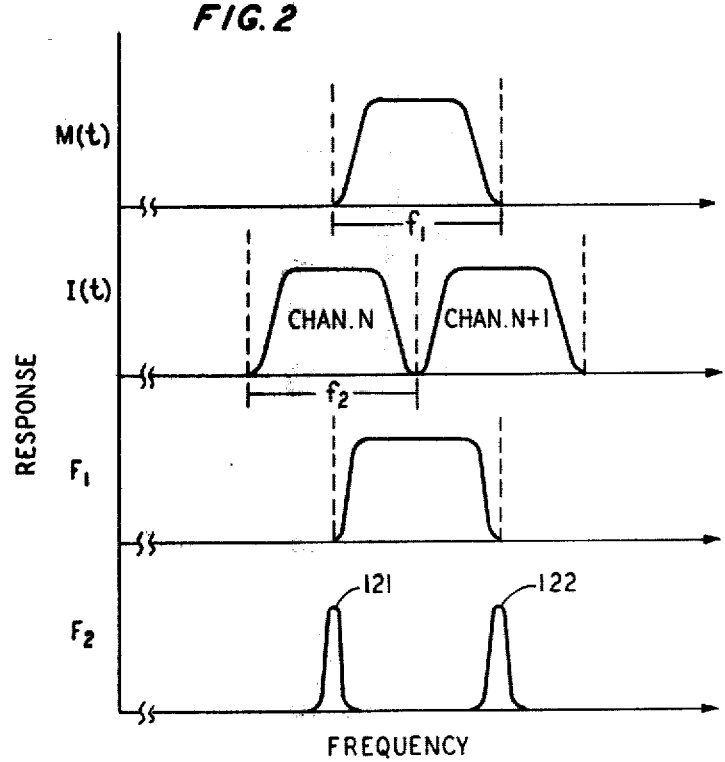
FIG. 2 illustrates a typical frequency response for the desired polarized signal, one or more overlapping interfering channels orthogonally polarized to the desired channel polarization, and the filters in the output and feedback path in FIG. 1.

In the arrangement of FIG. 1, an antenna 100 is directed to receive a signal 102 transmitted from a satellite repeater (not shown), signal 102 being, for example, a desired linearly polarized signal in a first channel of a frequency band $f_1$, as shown in FIG. 2, which is shown with the designation M(t) and is destined for the earth station including the arrangement of FIG. 1. Due to the location of the present earth station or the possibility that the present earth station also includes equipment associated with orthogonally polarized signals from the same satellite system or one or more terrestrial microwave systems, a second signal 104, designated I(t) is also concurrently received at antenna 100, signal 104 being, for example, orthogonally polarized to signal 102 and transmitted in a second channel of a frequency band $f_2$, as shown in FIG. 2, and comprising cross-polarization components which cause interference with the desired signal 102.

The signals 102 and 104 received at antenna 100 are applied to the input of a dual polarization coupler 105 which is capable of separating orthogonally polarized components in a received signal and transmitting such separated components over separate paths. More particularly, coupler 105 essentially functions to (1) transmit the desired signal 102 of a first polarization and cross-polarization components of a second orthogonally polarized interfering signal 104 over path 106, and (2) transmit the interfering orthogonally polarized signal 104 and any cross-polarization components from the desired signal 102 over path 107. Therefore, the signal on lead 106 can be represented by the expression $M(t)+\alpha I(t)$ while the signal on lead 107 can be represented by the expression $I(t)-\alpha M(t)$. Coupler 105 can comprise any suitable circuit known in the art.

The signal on lead 106 is amplified in a low noise type amplifier 108 and applied to one input of a hybrid circuit 110. The signal on lead 107 is amplified to a predetermined level in a low noise type amplifier 112 and then transmitted through a quadrature modulator 114 for adjustment of the phase and amplitude of each of the quadrature components as will be explained in greater detail hereinafter. The adjusted signal from quadrature modulator 114 is applied to a second input of hybrid circuit 110. Amplifiers 108 and 112, quadrature modulator 114 and hybrid circuit 110 can comprise any suitable circuit or arrangement capable of performing the functions described.

The output signal from quadrature modulator 114 provides an estimated cross-polarization interference cancellation signal which is combined with the amplified signal on lead 106 in hybrid circuit 110 to provide a corrected signal, which can be designated S(t), at the output thereof which is substantially free of cross-polarization interference from signal 104. The corrected signal is demodulated to, for example, IF frequencies in a down-converter 116. The desired polarized signal M(t) and any remaining cross-polarization components from I(t) that may not have been cancelled by the estimated cross-polarization interference cancellation signal in the frequency band $f_1$ is passed through a bandpass filter 118 for further processing in the receiver (not shown). The response of filter 118 is shown in FIG. 2 by the curve $F_1$.

The output of down-converter 116 is also applied to the input of a filter 120 having a passband which is just outside the frequency band $f_1$ of the desired signal 102 after down-conversion but near the center of the frequency band of the orthogonally polarized interfering channel. For example, if in FIG. 2 the channel N of interfering signal I(t) is received at antenna 100, then filter 120 would be designed to include a response or passband shown by the curve 121 so as to only pass any remaining components of channel N at the output of down-converter 116, which comprise frequency components in the passband shown by curve 121 and block any components outside this passband which, of course, include components of the desired polarized signal M(t). Similarly, if a second interfering channel N+1 of interfering signal I(t) were also received at antenna 100 with, or instead of, the signals of channel N, then filter 120 would be designed to include a passband as indicated by the curve 122 of FIG. 2 to pass only remaining components of orthogonally polarized channel N+1 at the output of down-converter 116 while blocking all signals outside this passband which, of course, would block components of the desired polarized signal M(t).

The output signal from filter 120 is applied to the input of a power detector 123 whose output voltage is proportional to the magnitude of the input signal squared. More particularly, power detector 123 obtains the envelope of the power of the input signal from filter 120 which detected output signal is at, for example, baseband frequencies and has lost coherence with the desired or interfering signal. It is to be understood that down-converter 116, filters 118 and 120 and power detector 123 can comprise any suitable circuit which is known and functions as described.

The output signal from power detector 123 is applied to the input of a processor 124 which generates control signals that are transmitted over leads 126 and 127 to the quadrature modulator 114 to appropriately vary the phase and amplitude of the interfering signal 104 sample received by antenna 100. The processor 124 also generates a dither signal which is added to the control signals to vary the phase and amplitude of the residual interference in the corrected signal S(t) from hybrid circuit 110 to achieve maximal interference suppression.

Figure 3:
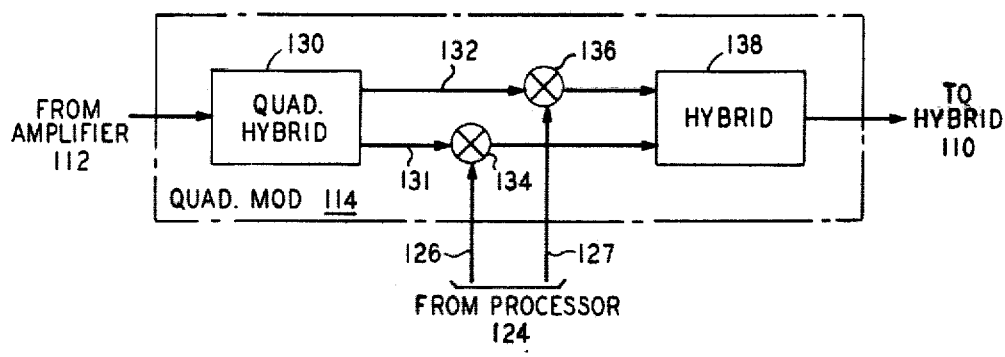
FIG. 3 illustrates a block diagram of an exemplary quadrature modulator for use in the arrangements of FIGS. 1 and 5.

FIG. 3 illustrates a typical quadrature modulator 114 which can be used for adjusting the phase and amplitude of the interfering signal 104 received at antenna 100. The exemplary quadrature modulator 114 comprises a quadrature hybrid 130 which divides the interference signal sample I(t) into two quadrature phased components which are transmitted as separate outputs on leads 131 and 132. Each of the quadrature phased components on leads 131 and 132 are modulated in mixers 134 and 136, respectively, by control signals from processor 124 on respective leads 126 and 127. The two components from mixers 134 and 136 are then recombined in a hybrid 138 to generate the estimated cancellation signal which is then combined with the amplified signal on lead 106 in hybrid 110 to give the corrected signal S(t). It is to be understood that the quadrature hybrid 130, mixers 134 and 136 and hybrid 138 of the exemplary quadrature modulator 114 shown in FIG. 3 can comprise any suitable circuit which is known. Additionally, any other suitable quadrature modulator which is known may also be used.

Figure 4:
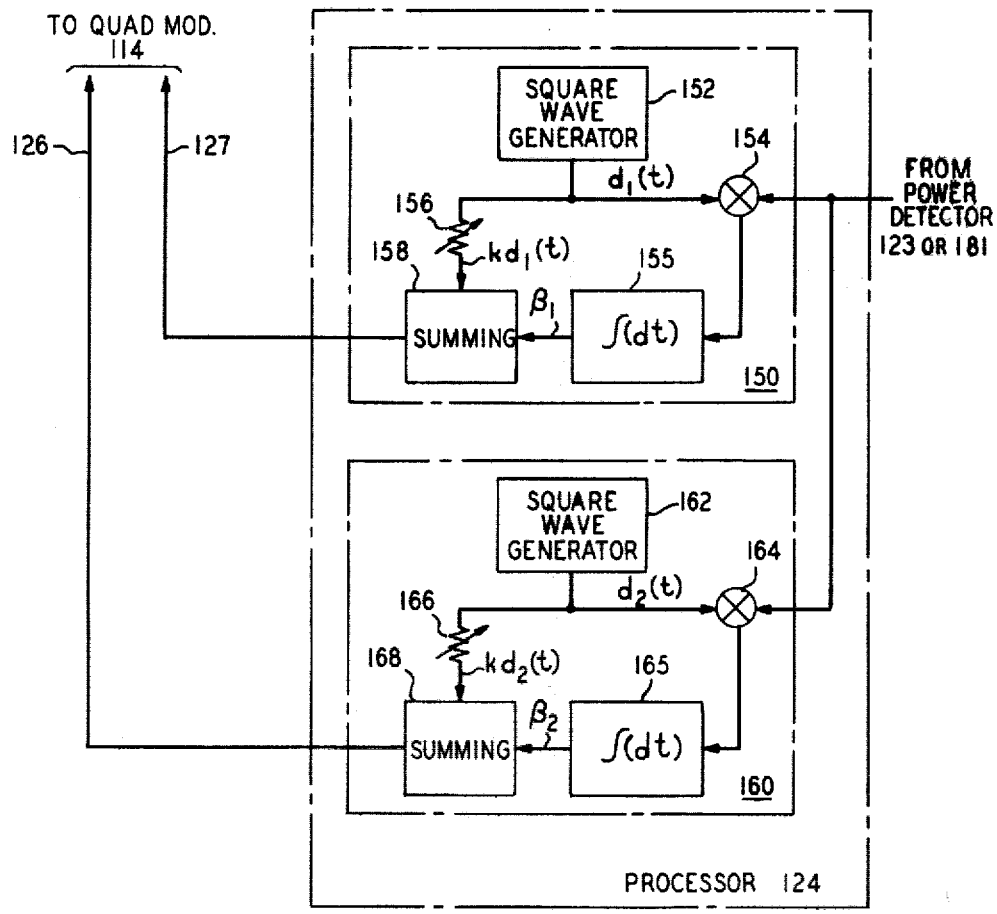
FIG. 4 illustrates a block diagram of a processor for use in the arrangements of FIGS. 1 and 5.

FIG. 4 illustrates a block diagram of processor 124 for use in the present adaptive cross-polarization interference suppression arrangement to generate the necessary control signals for appropriately adjusting the phase and amplitude of the quadrature phased components in mixers 134 and 136 of exemplary quadrature modulator 114 of FIG. 3. Processor 124 is described in the previously cited co-pending application, Ser. No. 81,552 filed for D. M. Brady and A. M. Gupta but is repeated here for completeness. Processor 124 is shown as comprising a first and a second control signal generating section designated 150 and 160, respectively.

First control signal section 150 includes a square wave generating source 152 which is capable of generating a square wave signal within a first frequency band within the baseband frequency but less than the bandwidth of the IF frequency band, which square wave signal is designated $d_1(t)$. Square wave signal $d_1(t)$ is applied to one terminal of a multiplying circuit 154 which multiplies this signal $d_1(t)$ with the output from power detector 123 or 181 to generate an output signal which is representative of such product. The output signal from multiplying circuit 154 is integrated with respect to time in an integrator circuit 155 which generates an output signal representative of such integration and is designated $\beta_1$.

The square wave signal $d_1(t)$ from generator 152 is also transmitted through a variable attenuator 156 to generate a desired weighted output signal which is designated $kd_1(t)$. Adjustment of variable attenuator 156 in turn adjusts the weighting factor, k, introduced in the square wave signal $d_1(t)$ passing therethrough. The output signal $\beta_1$ from integrator circuit 155 and the weighted square wave signal $kd_1(t)$ from attenuator 156 are added in summing circuit 158 to generate a control signal which has a small dither signal added thereto. This control and dither signal are transmitted over lead 127 to quadrature modulator 114 for appropriately varying the amplitude and phase of the signal on lead 132 being applied to mixer 136 in the exemplary modulator of FIG. 3.

Second control section 160 of processor 124 comprises an apparatus arrangement which corresponds to that of first control section 150. In second control section 160, a square wave generator 162 generates a square wave signal $d_2(t)$ at a second frequency band within the baseband frequency but less than the bandwidth of the IF frequency band. It is to be understood that the first frequency band and the second frequency band generated by square wave generators 152 and 162, respectively, comprise different frequency bands within the bandwidth of the baseband frequency.

The square wave signal from generator 162 and designated $d_2(t)$ is multiplied with the output signal from power detector 123 or 181 in a multiplying circuit 164 which resultant signal is integrated over time in integrator circuit 165. The square wave signal from generator 162 is weighted by variable attenuator 166 to provide a weighted output signal designated $kd_2(t)$. The weighted output signal from variable attenuator can be controlled by adjustment of the variable attenuator and such desired signal is added to the output of integrator 165, designated $\beta_2$, in summing circuit 168. The output of summing circuit 168 is a control signal with a small dither signal added which is applied over lead 126 to quadrature modulator 114 for appropriately varying the amplitude and phase of the signal on lead 131 being applied to mixer 134 in the exemplary modulator of FIG. 3. It is to be understood that square wave generators 152 and 162, multipliers 154 and 164, integrators 155 and 165, variable attenuator 156 and 166 and summing circuits 158 and 168 can comprise any suitable circuit for achieving the functions described hereinbefore.

In operation, the received signals pass through the various circuits shown in FIGS. 1-4 as outlined hereinbefore. Attenuators 156 and 166 of processor 124 are then adjusted until the power level at the output of filter 120 is at a minimum. Such minimum value indicates that the power level of the interference signal has been substantially minimized to a zero value and basically only the desired signal, M(t), forms the output signal of the present adaptive cross-polarization interference cancellation arrangement.

Figure 5:
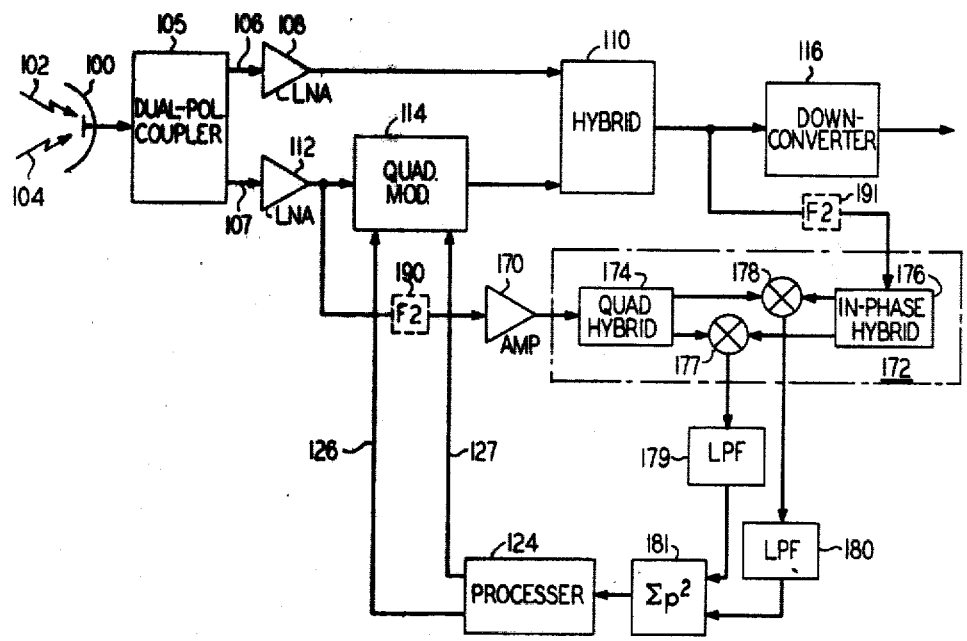
FIG. 5 illustrates a block diagram of an adaptive cross-polarization interference cancellation arrangement in accordance with the present invention for use in cancelling cross-polarization interference between orthogonally polarized signals received in the same frequency band.

FIG. 5 illustrates an adaptive cross-polarization interference cancellation arrangement in accordance with the present invention for use in cancelling cross-polarization interference between a desired polarized signal M(t) designated 102 and interfering cross-polarization components from a second orthogonally polarized signal I(t) designated 104 received in the same frequency band as the desired signal. In the arrangement of FIG. 5, antenna 100, dual polarization coupler 105, low noise type amplifiers 108 and 112, quadrature modulator 114, hybrid 110, down-converter 116 and processor 124 function as described previously for the correspondingly numbered elements in the arrangement of FIG. 1. The primary difference between the arrangements of FIGS. 1 and 5 lies in the structure of the elements in the feedback path.

In the feedback path in FIG. 5, the output signal from amplifier 112, in the received interference signal path 107, is also applied to a power amplifier 170 which effectively acts as a local oscillator in supplying its output signal to a circuit 172 which functions as a single sideband modulator. In the exemplary single sideband modulator circuit 172 shown in FIG. 5, the output signal from power amplifier 170 is split into two quadrature signals by a quadrature hybrid 174, each quadrature output signal being applied as one input to a separate one of mixers 177 and 178. Concurrent therewith, the output signal from hybrid 110, which is at r-f frequencies, is split into two in-phase component signals by an in-phase hybrid 176, each in-phase output signal being applied as the other input to a separate one of mixers 177 and 178. The baseband frequency signals being generated by mixers 177 and 178 represent the in-phase and quadrature components of the correlation between the orthogonally polarized signals received at antenna 100 and are applied to low-pass filters 179 and 180, respectively, which allow only signals in the baseband frequencies to pass therethrough. The in-phase and quadrature components represent the real and imaginary portions of the correlation.

The outputs from filters 179 and 180 are applied to separate inputs of a complex envelope power detector 181 which functions to detect the power envelope of each of the input signals from filters 179 and 180, which detected envelopes are added in a summing circuit to produce an output signal representative thereof. This output signal from power detector 181 is applied as the input to processor 124 which functions as described for processor 124 shown in FIGS. 1 and 4 to complete the feedback path and cause adjustment of the phase and amplitude of the interfering signal samples in quadrature modulator 114 to maximally cancel the cross-polarization interference at the output of hybrid 110.

Figure 6:
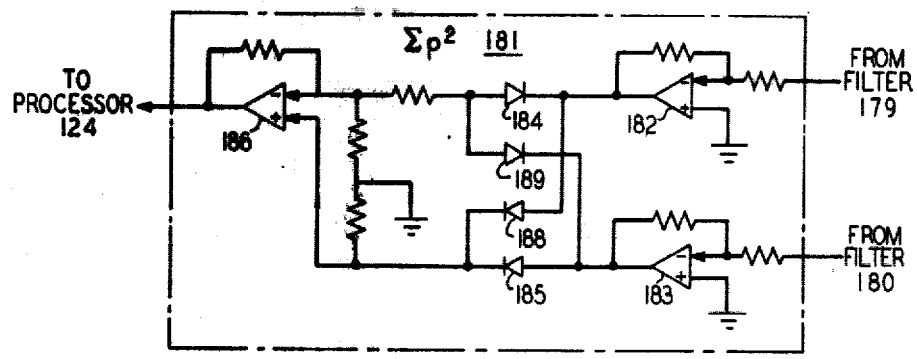
FIG. 6 illustrates an exemplary circuit diagram of a complex envelope power detector for use in the feedback path of the arrangement of FIG. 5.

An exemplary circuit diagram for use in complex envelope power detector 181 of FIG. 5 is shown in FIG. 6. In the exemplary circuit of FIG. 6, each of the output signals from filters 179 and 180 are applied to one input of a separate operational amplifier 182 and 183, respectively.

The output of each of the operational amplifiers 182 and 183 is applied via properly poled diodes 184 and 188, and 185 and 189, respectively, to the inputs of another operational amplifier 186, the output of amplifier 186 providing the input signal to processor 124. Effectively, diodes 184 and 188, together with operational amplifier 186, detect the power envelope of the signals from filter 179, while diodes 185 and 189, together with operational amplifier 186, detect the power envelope of the signals from filter 180, which power envelopes are added together in amplifier 186 to generate the appropriate signal to processor 124.

The arrangement of FIG. 5 can also be used when input signals 102 and 104 are received in separate channels including signals in a first and a second overlapping frequency band as described for the arrangement of FIG. 1. Under such condition, optional filters 190 and/or 191 should be inserted into the input paths of single sideband modulator 172 to permit the passage of signals in the second frequency band but not in the first frequency band. Filters 190 and/or 191 would have the same characteristic passband as filter 120 of FIG. 1 and as shown in FIG. 2.

It is to be understood that the above-described embodiments are simply illustrative of the principles of the invention. Various other modifications and changes may be made by those skilled in the art which will embody the principles of the invention and fall within the spirit and scope thereof.

I claim:

1. An adaptive cross-polarization interference cancellation arrangement comprising:
   an antenna (100) capable of receiving a signal which may include a first desired signal (102) polarized in a first direction and a second interfering signal (104) polarized in a second direction orthogonal to the first direction and comprising cross-polarization components thereof;
   means (105) coupled to the antenna capable of separating the received signal into third and fourth signals comprising only components of the received signal including the first and the second polarization directions, respectively, and transmitting the third and fourth signals along respective first (106) and second (107) paths;
   means (114) capable of adjusting the phase and amplitude of the fourth signal in the second path in response to control signals;
   means (110) capable of combining the third and the adjusted fourth signals to generate an output signal which primarily includes the first desired signal; and
   means (124) capable of generating the appropriate control signals to the adjusting means to appropriately adjust the amplitude and phase of the fourth signal
   characterized in that
   the generating means (124) comprises:
   means (120, FIG. 1; 172, 179, 180, FIG. 5) coupled to the output of the combining means capable of extracting a sample of the cross-polarization components of the second interfering signal remaining in the output signal from the combining means;
   power detection means (123, FIG. 1; 181, FIG. 5) capable of generating an output signal representative of the power envelope of the output signal of said extracting means; and
   a processor (124) capable of generating the appropriate control signals, in response to the output signal from said power detection means, for transmission to the adjusting means for appropriately adjusting the phase and amplitude of the fourth signal to achieve maximum cancellation of cross-polarization components of the second interfering signal in the third signal at the output of the combining means.

2. An adaptive cross-polarization interference cancellation arrangement in accordance with claim 1 wherein the first desired signal includes information transmitted in a channel of a first frequency band and the second interfering signal includes information transmitted in a channel of a second frequency band which partially overlaps the first frequency band characterized in that
said extracting means (120) comprises a band-pass filter which has a pass-band that is outside the first frequency band but within the non-overlapping portion of the second frequency band.

3. An adaptive cross-polarization interference cancellation arrangement in accordance with claim 1 wherein the first desired signal includes information transmitted in a channel of a first frequency band and the second interfering signal includes information transmitted in a channel of a second frequency band which partially overlaps the first frequency band characterized in that
said extracting means (172, 179, 180, 190, 191, FIG. 5) comprises:
means (172) including a first and a second input terminal coupled to the output of the combining means (110) and the separating means where the fourth signal is transmitted, respectively, and capable of modulating input signals at the first and second input terminals and generating an output signal representative of such modulation;
a first band-pass filtering means (190, 191) which has a pass-band that is outside the first frequency band but within the non-overlapping portion of the second frequency band coupled to one input terminal of said modulating means; and
low-pass filtering means (179, 180) capable of passing only signals in the lower sideband of the output signal from said modulating means for transmission to said power detection means.

4. An adaptive cross-polarization interference cancellation arrangement in accordance with claim 3 characterized in that
said extracting means further comprises:
a second band-pass filtering means (190, 191) which has a pass-band that is outside the first frequency band but within the non-overlapping portion of the second frequency band coupled to the other input terminal of said modulating means.

5. An adaptive cross-polarization interference cancellation arrangement in accordance with claim 1 wherein the first desired signal and the second interfering signal each include information transmitted in a channel in a first frequency band characterized in that
said extracting means (172, 179, 180, FIG. 5) comprises
means (172) capable of modulating the output signal from the combining means with the fourth signal at the output of the separating means and generating an output signal representative of such modulation; and
low-pass filter means (179, 180) capable of passing only signals in the lower sideband of the output signal from said modulating means for transmission to said power detection means.

6. An adaptive cross-polarization interference cancellation arrangement in accordance with claim 5 characterized in that
said modulating means (172) comprises
means (174) capable of generating quadrature components of the fourth signal received from the output of said separating means
means (176) capable of generating a pair of in-phase components of the output signal from the combining means; and
a first and a second mixer (177, 178), each mixer being capable of modulating a separate one of the quadrature components from said quadrature components generating means with a separate one of said in-phase components from said in-phase component generating means and generating an output signal representative of each of such modulations for transmission to said low-pass filtering means.

7. An adaptive cross-polarization interference cancellation arrangement in accordance with claim 6 characterized in that
the low-pass filtering means comprises a first and a second low-pass filter, each filter being disposed to filter the output signal from a separate one of the first and second mixers; and
the power detection means comprises:
means (182-185, 188, 189) capable of generating signals representative of the power envelope of each of the output signals from the first and second low-pass filters; and
means (186) capable of adding the signals generated by said power envelope generating means and generating a signal representative of such addition for transmission to the processor.

8. An adaptive cross-polarization interference cancellation arrangement in accordance with claim 1, 2, 3, or 5 characterized in that
the adjusting means (114) is further capable of deriving quadrature components of the fourth signal at the output of the separating means and adjusting the amplitude and phase of said quadrature components in response to control signals from the processor; and
the processor (124) comprises a first (150) and a second (160) control signal generating section, each section being capable of generating a control signal in response to the output signals from the power detection means for appropriately adjusting the phase and amplitude of a separate one of the quadrature components in the adjusting means to cause said adjusting means to generate an estimated cross-polarization interference cancellation signal which maximally reduces the cross-polarization interference at the output of the combining means.

9. An adaptive cross-polarization interference cancellation arrangement in accordance with claim 8 characterized in that
each control signal generating section (150, 160) of the processor (124) comprises:
a square wave generator (152, 162) capable of generating a square wave output signal at a frequency band within a baseband frequency spectrum which is different than the frequency band of the square wave generator in the other control signal generating section;

means (154, 164) capable of multiplying together the instantaneous and concurrent output signal values of said power detection means and said square wave generator to generate an output signal representative of such product;

means (155, 165) capable of providing an output signal representative of an integration with time of the output signal of said multiplying means;

means (156, 166) capable of appropriately weighting the output signal of said square wave generator to form a dither output signal; and means (158, 168) capable of adding the output signals of said integration means and said weighting means to generate the control signals for use in the adjusting means.

* * * * *